United States Patent
Klammer et al.

(10) Patent No.: US 12,151,405 B2
(45) Date of Patent: Nov. 26, 2024

(54) PLASTICIZING UNIT INCLUDING A PLASTICIZING SCREW ROTATIONALLY AND LINEARLY MOVABLE WITHIN AN INJECTION CYLINDER AND HAVING A DAM ELEMENT

(71) Applicant: ENGEL AUSTRIA GmbH, Schwertberg (AT)

(72) Inventors: Guenther Klammer, Aschbach Markt (AT); Thomas Koepplmayr, Marchtrenk (AT); Gerhard Baeck, Schwertberg (AT); Raffael Johannes Rathner, Scharnstein (AT); Klaus Fellner, Steyr (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 0 days.

(21) Appl. No.: 18/215,557

(22) Filed: Jun. 28, 2023

(65) Prior Publication Data
US 2024/0009889 A1    Jan. 11, 2024

(30) Foreign Application Priority Data
Jul. 11, 2022   (AT) .............. A 50509/2022

(51) Int. Cl.
*B29B 7/42* (2006.01)
*B29B 7/72* (2006.01)
*B29B 7/80* (2006.01)

(52) U.S. Cl.
CPC .............. *B29B 7/423* (2013.01); *B29B 7/428* (2013.01); *B29B 7/72* (2013.01); *B29B 7/801* (2013.01)

(58) Field of Classification Search
CPC ........... B29B 7/423; B29B 7/428; B29B 7/72; B29B 7/801; B29C 48/74; B29C 48/745
See application file for complete search history.

(56) References Cited

U.S. PATENT DOCUMENTS 3,256,562 A * 6/1966 Heard, Jr. ............. B29C 48/797
                                                425/132
3,263,276 A * 8/1966 Maier ..................... B29C 45/50
                                                425/208

(Continued)

FOREIGN PATENT DOCUMENTS

| AT | 400 315 | 12/1995 |
| CN | 1252749 | 5/2000 |

(Continued)

OTHER PUBLICATIONS

Machine translation for JP 3354986 B2 Dec. 2002.*

*Primary Examiner* — Charles Cooley
(74) *Attorney, Agent, or Firm* — Wenderoth, Lind & Ponack, L.L.P.

(57) ABSTRACT

A plasticizing unit includes an injection cylinder having a dispensing opening, via which a plasticized material can be dispensed, and a plasticizing screw arranged to be rotationally and linearly movable in the injection cylinder and having an axis of rotation. A plasticizing zone is formed between the plasticizing screw and the injection cylinder in the radial direction relative to the axis of rotation of the plasticizing screw. The plasticizing screw has a dam element, and in the injection cylinder there is a first opening in the area of the plasticizing zone and/or the dam element and a second opening between the dam element and the dispensing opening.

24 Claims, 10 Drawing Sheets

(56) References Cited

U.S. PATENT DOCUMENTS

| | | | | |
|---|---|---|---|---|
| 4,730,935 A | * | 3/1988 | Kolossow | B29C 48/55 366/82 |
| 4,897,236 A | * | 1/1990 | Rabiger | B29C 48/361 366/85 |
| 4,959,186 A | * | 9/1990 | Dollhopf | B29B 7/489 425/173 |
| 5,130,070 A | * | 7/1992 | Martin | B29C 48/76 264/102 |
| 5,419,634 A | * | 5/1995 | Bacher | B29C 48/745 366/89 |
| 5,651,944 A | * | 7/1997 | Schulz | B29B 17/0026 366/85 |
| 6,196,820 B1 | * | 3/2001 | Straka | B29C 45/1753 425/84 |
| 6,206,558 B1 | * | 3/2001 | Beckwith | B29B 7/58 366/78 |
| 6,406,174 B2 | | 6/2002 | Bacher et al. | |
| 7,866,876 B2 | | 1/2011 | Schulz | |
| 8,628,323 B2 | | 1/2014 | Craig et al. | |
| 2001/0040837 A1 | | 11/2001 | Bacher et al. | |
| 2004/0151058 A1 | * | 8/2004 | Schafer | B29C 48/92 366/100 |
| 2010/0034917 A1 | * | 2/2010 | Schulz | B29C 48/69 425/377 |
| 2010/0310700 A1 | * | 12/2010 | Schulz | B29B 7/845 425/209 |
| 2012/0082753 A1 | | 4/2012 | Craig et al. | |
| 2024/0009889 A1 | * | 1/2024 | Klammer | B29B 7/423 |
| 2024/0083087 A1 | * | 3/2024 | Klammer | B29C 48/69 |

FOREIGN PATENT DOCUMENTS

| | | |
|---|---|---|
| CN | 101432119 | 5/2009 |
| DE | 36 15 586 | 5/1987 |
| DE | 198 11 273 | 9/1999 |
| DE | 200 80 290 | 2/2002 |
| EP | 0 343 280 | 11/1989 |
| JP | 3354986 | 12/2002 |
| JP | 2021-123000 | 8/2021 |
| WO | 93/04841 | 3/1993 |
| WO | 94/29097 | 12/1994 |
| WO | 98/47687 | 10/1998 |
| WO | 2007/124519 | 11/2007 |

* cited by examiner

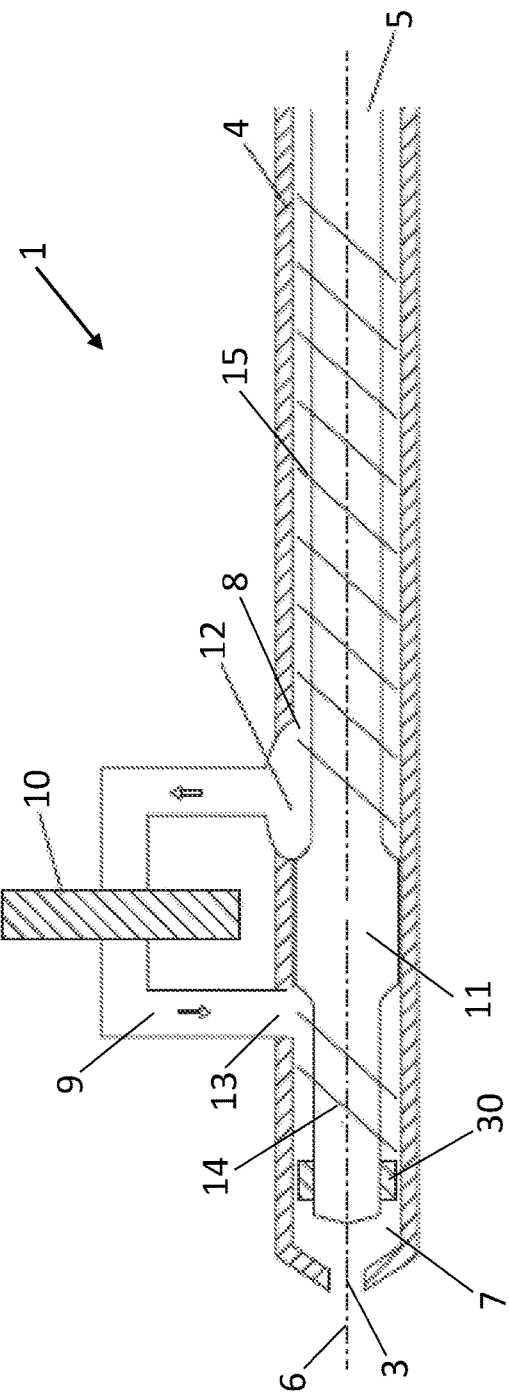

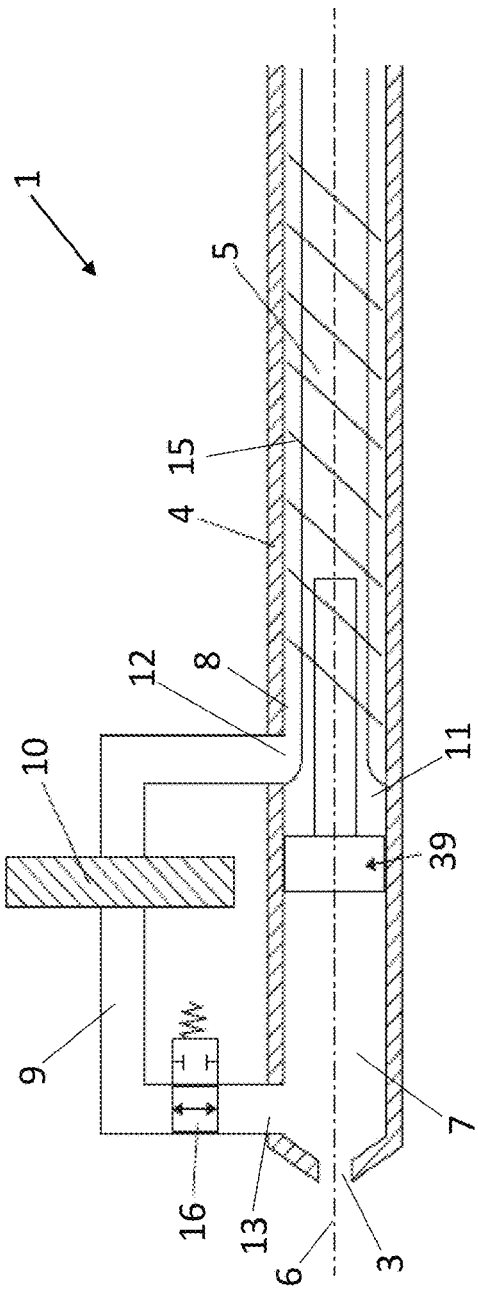
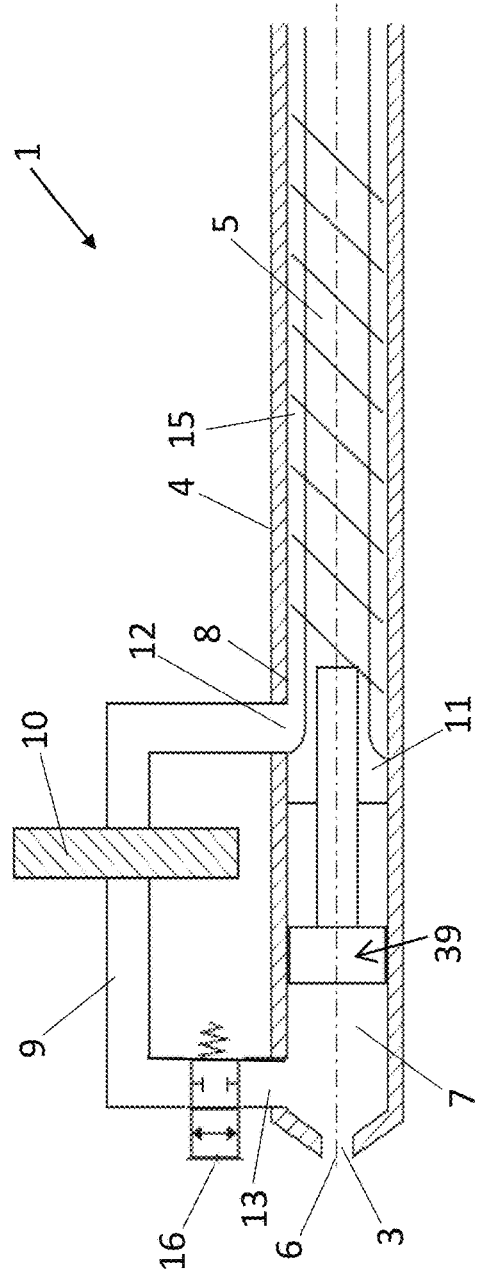

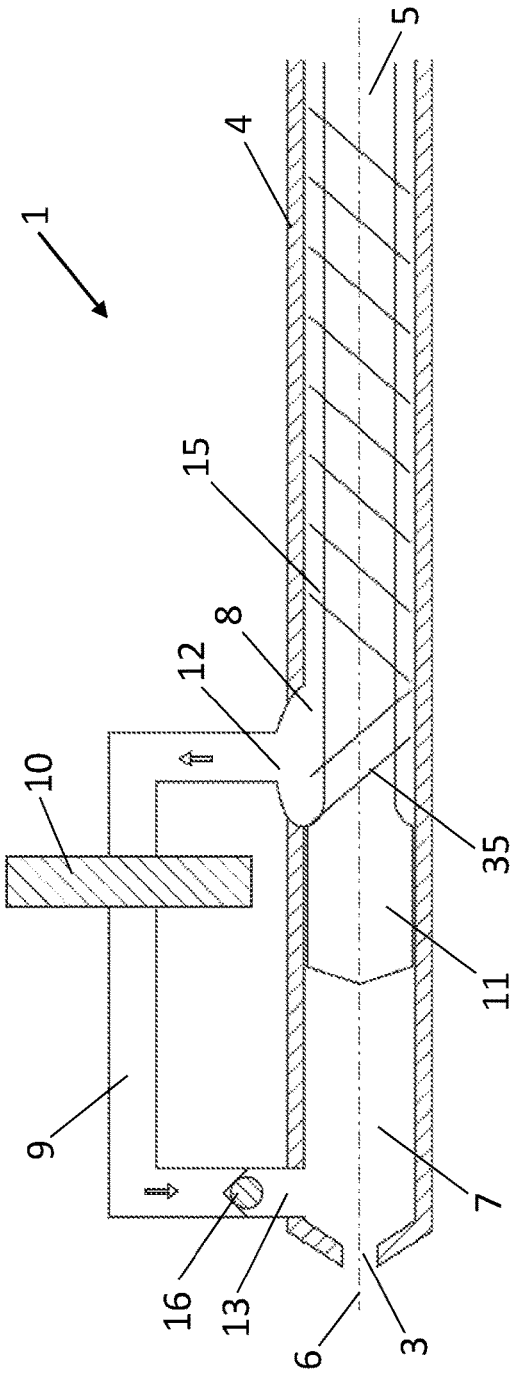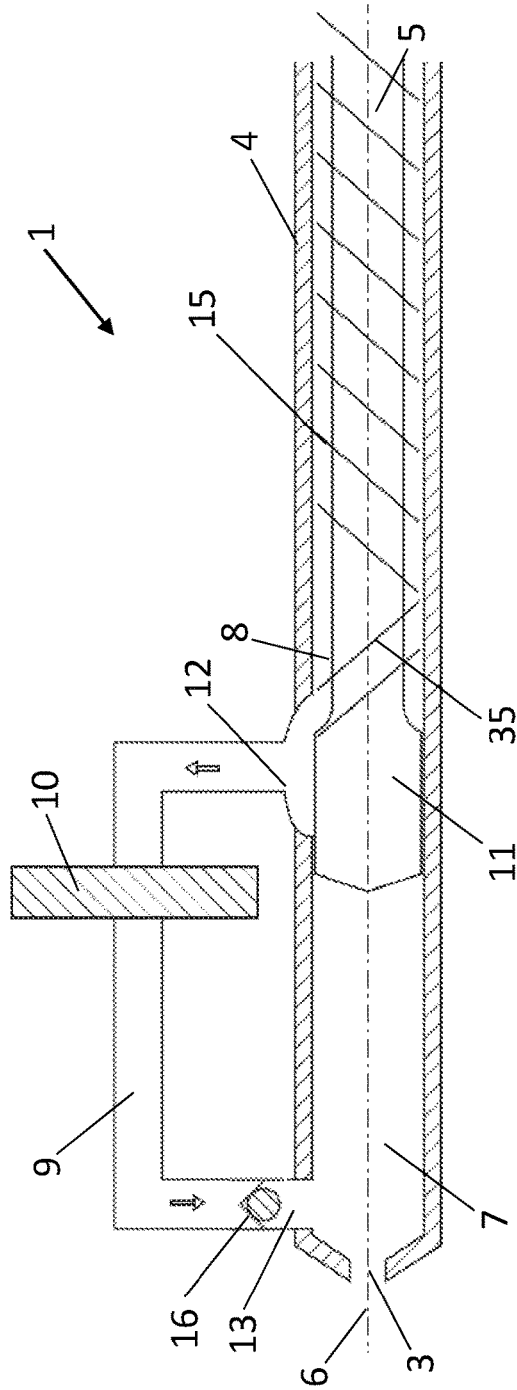

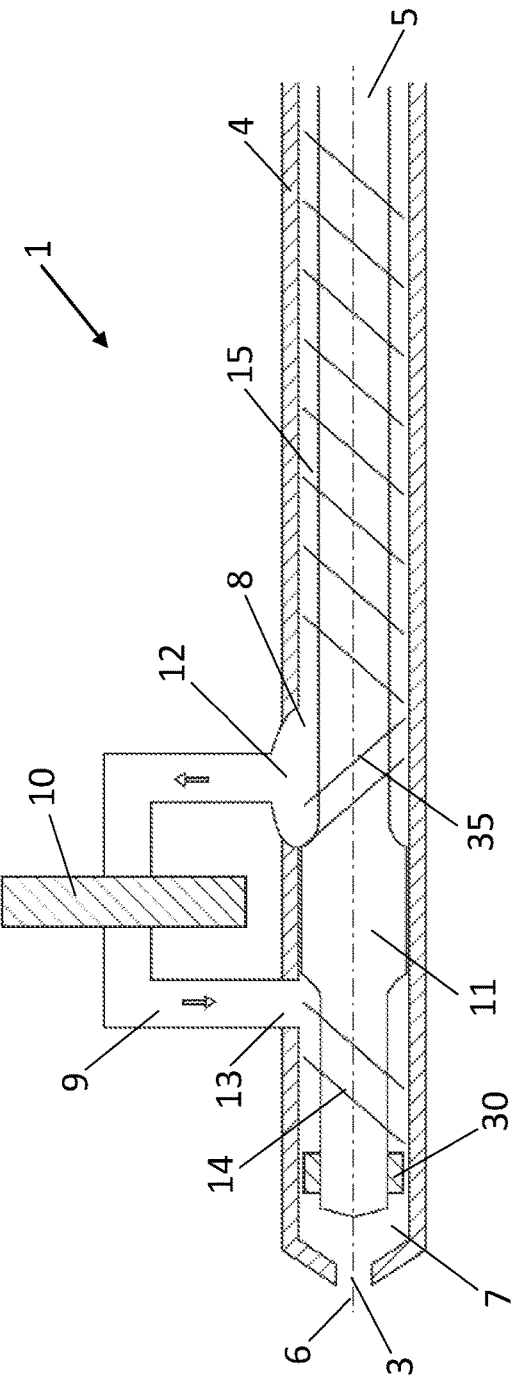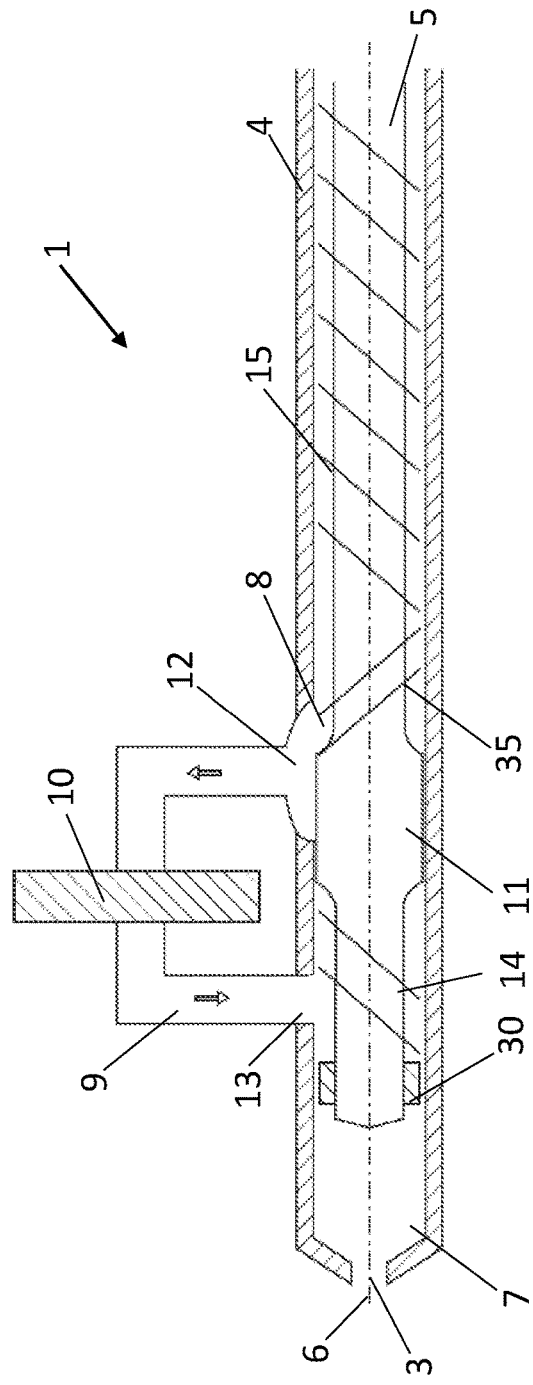

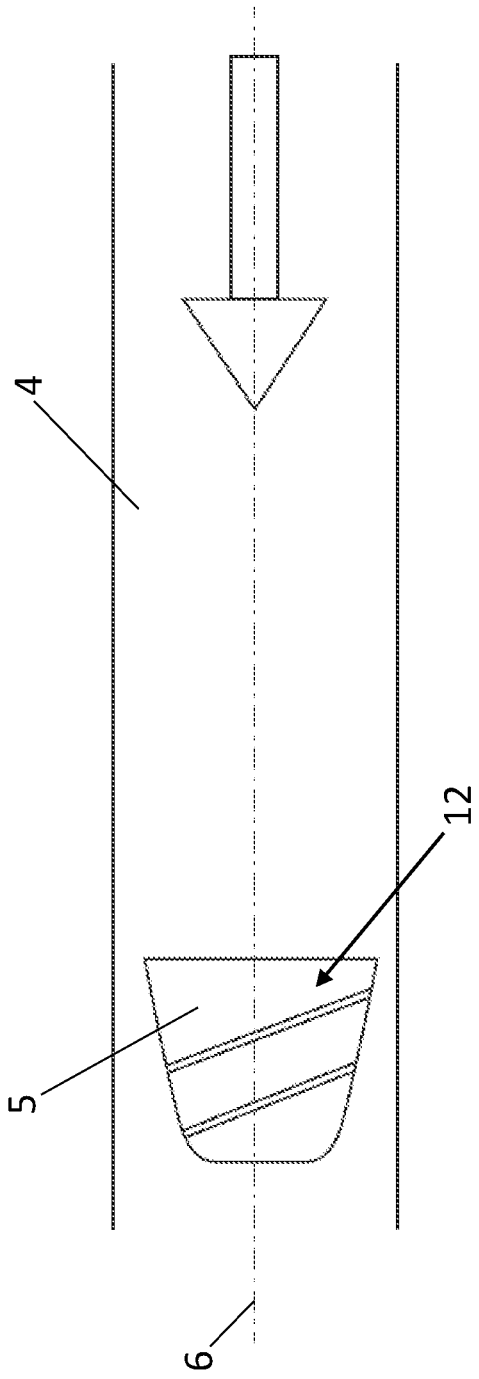

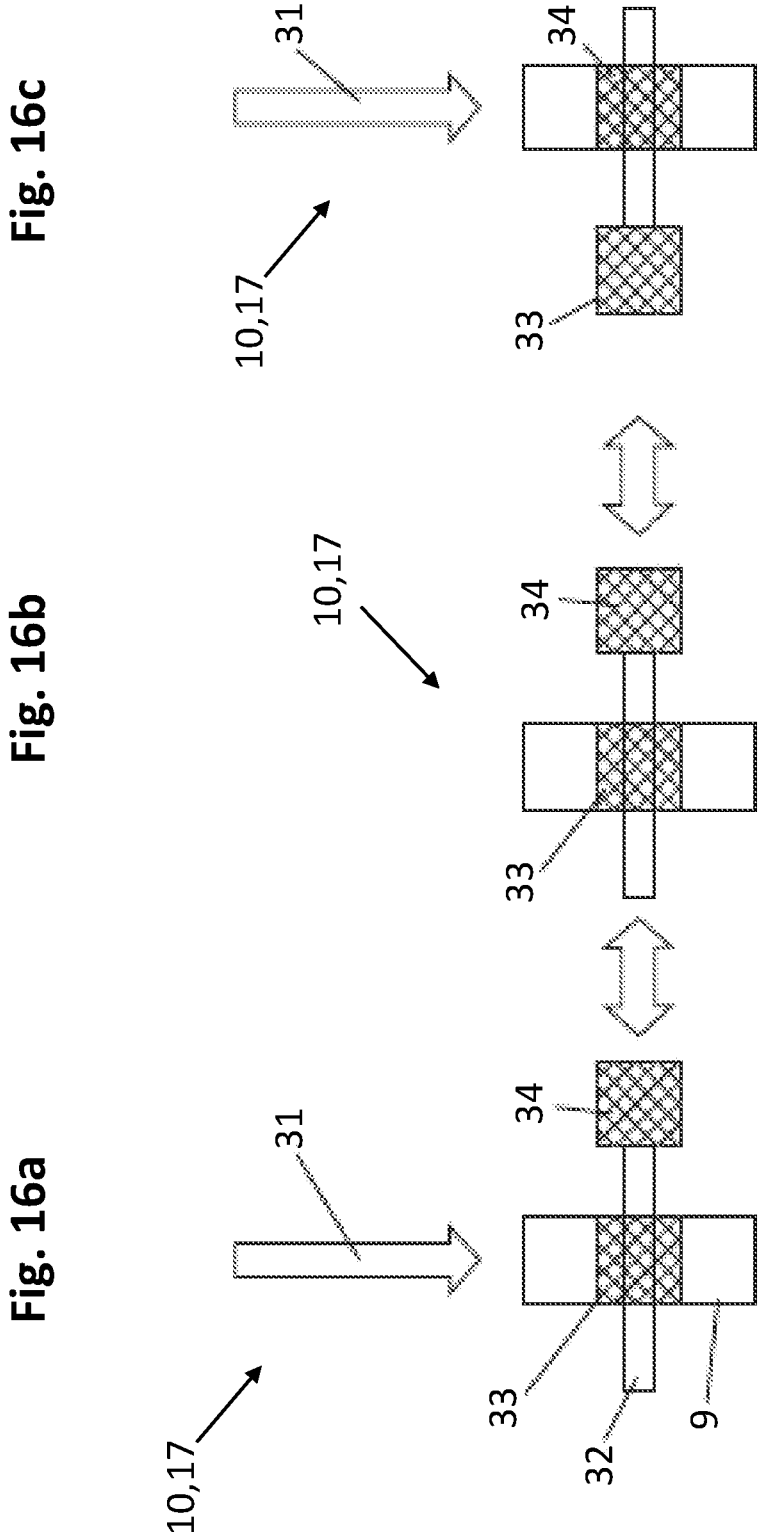

PLASTICIZING UNIT INCLUDING A PLASTICIZING SCREW ROTATIONALLY AND LINEARLY MOVABLE WITHIN AN INJECTION CYLINDER AND HAVING A DAM ELEMENT

BACKGROUND OF THE INVENTION

The present invention relates to a plasticizing unit for a molding machine, a molding machine with such a plasticizing unit, a use of a plasticizing screw, a plasticizing method, as well as a control or regulating device for controlling or regulating a drive of a plasticizing screw of a plasticizing unit.

'Molding machines' as used herein may include injection-molding machines, transfer-molding machines, presses and the like. Molding machines in which the plasticized material is supplied to an open mold are also entirely conceivable.

The state of the art is to be outlined below with reference to an injection-molding machine. This applies analogously to molding machines in general.

Generic plasticizing units for injection-molding machines include an injection cylinder having a dispensing opening, via which dispensing opening a plasticized material can be dispensed, and a plasticizing screw arranged so as to be rotationally and linearly movable in the injection cylinder and has an axis of rotation. A plasticizing zone is formed between the plasticizing screw and the injection cylinder in the radial direction relative to the axis of rotation of the plasticizing screw.

Corresponding plasticizing units are used in injection-molding machines to plasticize a plasticizable material through a rotational movement of the plasticizing screw. The plasticized material is plasticized due to the shear energy, shear heat, and optionally externally supplied heat energy. This generally takes place in the plasticizing zone of the plasticizing unit.

After the material to be plasticized has been plasticized, the plasticized material is collected in a space that has formed—the space in front of the screw—wherein the plasticized material can be pushed out of the plasticizing unit through an axial movement of the plasticizing screw and injected into a mold cavity of a mold, where the plasticized material can in turn cure (and can thus solidify, for example, to form a finished product, molded part or semi-finished product).

It is known from the state of the art to process contaminated plastics as material to be plasticized. These plastics can be for example recyclates, material to be ground or agglomerates, which are used for example in a recycling or compounding application.

This topic is becoming ever more important, wherein through the recycling of materials to be plasticized (for example thermoplastics) they can be supplied for a new use or a new area of application and thus a marked advantage is created with respect to environmental friendliness.

However, in order to be able to use such recycled materials in an injection-molding process, it is necessary to purify them, wherein the contaminants are to be removed from the material to be plasticized.

For this purification or prepurification of the materials to be plasticized, it is known that, in a first step, the contaminated material is plasticized by a continuously operating plasticizing unit and is then purified by degassing processes and filter systems.

After filtration and degassing, the plasticized material is cooled again and solidifies, wherein the purified material is usually brought directly into a form that is easy to process further, such as for example granules.

The granules produced from purified and degassed recycled material can then be used subsequently by an injection-molding process in an injection-molding machine.

However, it has proved to be disadvantageous here that a relatively high expenditure of energy and effort is necessary for the purification of this material and for the preparation of the material for an injection-molding process.

SUMMARY OF THE INVENTION

The object of the present invention is therefore to provide a plasticizing unit and/or a plasticizing method in which the disadvantages of the state of the art are at least in part improved and/or a more energy-efficient recycling of plasticizable material can be implemented and/or a more energy-efficient purification of material to be plasticized is possible and/or a direct processing of material to be purified and plasticized is made possible and/or a more continuous, rapid or energy-saving possibility for plasticizing plasticized material is presented.

This object is achieved according to the invention by a plasticizing unit for a molding machine as described below, a molding machine with such a plasticizing unit, a use of a plasticizing screw as described below, a plasticizing method as described below, and/or a control or regulating device for controlling or regulating a drive of a plasticizing screw as described below.

According to the invention, a plasticizing unit for a molding machine includes an injection cylinder having a dispensing opening, via which dispensing opening a plasticized material can be dispensed, and a plasticizing screw arranged so as to be rotationally and linearly movable in the injection cylinder and has an axis of rotation. A plasticizing zone is formed between the plasticizing screw and the injection cylinder in the radial direction relative to the axis of rotation of the plasticizing screw. The plasticizing screw has a dam element, and the injection cylinder has a first opening in the area of the plasticizing zone and/or the dam element, and a has second opening between the dam element and the dispensing opening.

The present invention thus makes it possible to also use contaminated materials in a process in a molding machine, in particular an injection-molding machine, wherein the contaminated material is plasticized via the plasticizing unit of the molding machine, is guided out of the injection cylinder, can be purified and is then supplied to the injection cylinder again, in order to push out the purified, plasticized material via the plasticizing screw and supply it for example to a mold, or more particularly in this embodiment, a mold cavity of a mold.

This procedure has the substantial advantage over the state of the art that a recycled material has to be plasticized only once and can be purified, which represents a much higher energy efficiency during the processing.

Furthermore, a simple possibility is created for placing a filter device for the plasticized material outside the injection cylinder, wherein through a molten material line the redirection of the plasticized material, the filter device is virtually freely dimensionable and positionable on the molding machine or the plasticizing unit. The filter device can thereby be precisely adapted to the requirements of the filtering process irrespective of the size of the injection cylinder. Moreover, a cleaning of the filter device or an exchange of filter elements possibly present can be simplified to the effect that the accessibility of the filter device is increased.

A further advantage is created to the effect that plasticizing units known from the state of the art with plasticizing screws which serve on the one hand for plasticizing and on the other hand for injecting the plasticized material can be utilized, whereby a very compact design of the plasticizing unit can be implemented even in the case of processing of contaminated materials.

Through the filtering of the plasticized material directly in the molding process, the steps described at the beginning (such as for example the production of granules) can be omitted, which obviously represents a significant improvement in terms of complexity and economic efficiency.

A corresponding application of an embodiment of the present invention can thus also make a recycling application or compounding application considerably more attractive to a user, wherein the production costs and the production effort are minimized, whereby the environmental friendliness can be increased (through increased use).

A plasticizing unit according to the invention can have precisely one plasticizing screw or also be formed as a twin-screw design or multi-screw design. In the following description, the plasticizing screw (singular) is sometimes mentioned. However, this is to be understood such that analogous embodiments with several plasticizing screws are likewise applicable.

Of course, in embodiments with several plasticizing screws several screw axes are present, with respect to which the plasticizing screw is movable in each case axially and in a rotating manner.

Through its use in already known embodiments of the state of the art, as described for example in the introduction to the description, a device according to the invention or a method according to the invention can be used and subsequently installed.

By molding machines may be meant injection-molding machines, transfer-molding machines, presses and the like. Molding machines in which the plasticized material is supplied to an open mold are also entirely conceivable.

Within the meaning of the present document, by a filtration and/or a filtering of a plasticized material may be meant that foreign substances present in the plasticized material are, preferably mechanically, released, removed, discharged and/or separated at least partially from the plasticized material. This can thus also include a separation method.

Preferably, the dispensing opening of the injection cylinder is connected to at least one injection nozzle and/or a shutoff nozzle and/or is formed as such. For example, the at least one injection nozzle and/or shutoff nozzle can be attached to a mold, in particular an injection mold, and a plasticized material can be supplied to the mold and/or injected into the mold from the injection cylinder via the at least one injection nozzle and/or shutoff nozzle.

At least one molten material line can be provided, which fluidically connects the first opening to the second opening.

The at least one molten material line is preferably formed to at least partially supply a plasticized material emerging from the first opening of the injection cylinder to the injection cylinder again via the second opening.

At least one filter device for filtering plasticized material, in particular plasticized plastic, is or can be arranged in the at least one molten material line.

Preferably, the at least one molten material line has at least one valve element, preferably a check valve.

The at least one valve element is arranged in the at least one molten material line between the at least one filter device and the connection of the second opening of the injection cylinder.

Through a corresponding valve element, it can be ensured that plasticized material, preferably filtered plasticized material, does not change flow direction (for example during the injection process) and flow back into the molten material line again.

The valve element can be formed as a controllable or regulatable valve element or as a nonreturn valve.

The valve element can be a two- or three-way valve.

At least one sensor can be provided in the molten material line, for example in order to detect a signal characteristic of a state and/or a contamination of the plasticized material and/or the filter device.

A corresponding sensor can be formed as a pressure sensor, temperature sensor, ultrasonic sensor, color sensor, rheometer and/or spectrometer.

A control or regulating device can take into account a characteristic signal of the at least one sensor in the molten material line for the control or regulation.

Preferably, the at least one molten material line has at least one discharge opening, preferably between the at least one filter device and the first opening of the injection cylinder.

Through the provision of a discharge opening, plasticized material can be discharged from the molten material line, in order to be able to flush the plasticized material out of the molten material line for example before shutdown of the process, in order to be able to prevent solidification in the molten material line.

A further aspect which is made possible through the provision of a discharge opening is the cleaning of the filter device.

Thus, for example, an outlet opening of the injection cylinder is closed and plasticized material is collected in the space in front of the screw.

A space in front of the screw can be formed along the axis of rotation of the plasticizing screw between an end of the plasticizing screw facing the dispensing opening and the dispensing opening.

A pressure is then exerted on this plasticized material collected in the space in front of the screw (the melt cushion) via the plasticizing screw, the dam element and/or the injection plunger. Thus, the plasticized material flows back into the molten material line via the second opening—as the outlet opening is closed—and thus runs through the filter device in the opposite direction, whereby deposits and contaminants are removed from the filter device (i.e. the filter device is backflushed).

After the filter device has been backflushed, a discharge opening can now be provided between filter device and first opening of the injection cylinder and opened, with the result that the backflushed plasticized material with the contaminants carried therein can be discharged from the filter device.

Such a corresponding backflushing process can for example be carried out between the production cycles of the plasticizing unit after a given number of cycles or for example in the presence of measurement data which indicate an increased filter blocking.

A filter blocking or filter coating can, for example, be determined by the measurement of a pressure before the filter device and after the filter device, wherein the pressure difference prevailing between the two measurements represents a meaningful measure thereof.

Preferably, the at least one filter device has a filter change device, preferably wherein the filter device is formed as a cassette filter.

A cassette filter can have two or more filter elements, wherein a first filter element in an engaged position is located in a melt stream of the plasticized material, in order to perform a filtration of the plasticized material. In the meantime, a further filter element of the cassette filter is released and is not in contact with the plasticized material.

While the first filter element is in an engaged position, the further filter element of the cassette filter can be cleaned of contaminants or exchanged.

If the first filter element has a greater coating and/or contaminants, via the cassette filter the further filter element can be brought into an engaged position via a change device, wherein a filtration of the plasticized material by the further filter element takes place and the first filter element is released for cleaning or changing.

The filter device can be formed similarly to a cassette deck and have two or more receiving devices for filter elements, wherein, through a change device (preferably an actuator), a receiving device can selectively be brought into an engaged position with the plasticized material and/or a released filter element can be positioned out of or in the receiving device.

The filter change device can, for example, be formed as a plate screen changer, piston screen changer, cassette screen changer and/or belt filter.

If a belt filter is provided as filter change device, the belt filter can be guided through the melt stream of the plasticized material continuously or at intervals, wherein blocked filter regions or contaminants of the at least one filter device can be moved out of the melt stream of the material to be plasticized by the filter change device, in order not to impair the ongoing process of the plasticizing unit.

The moving in and/or out of the at least one filter device can for example take place in an operating state of the plasticizing unit, in which a melt stream of plasticized material is not actively being pushed out by the plasticizing screw, with the result that an active pressure due to a melt stream of the plasticized material does not act on the at least one filter device during the moving in and/or moving out by the filter change device.

At least one actuator can be provided for conveying the plasticized material against the flow direction of the melt stream, in order to relieve a pressure of the plasticized material applied to the at least one filter device.

Through a corresponding embodiment, the possibility can be created to influence, utilizing the at least one actuator, pressure conditions prevailing on the at least one filter device (which act on the at least one filter device through the plasticized material) such that a pressure relief of the at least one filter device—which can for example be utilized for a filter change—can be carried out. This is preferably possible without additionally sealing the at least one filter device off from the melt stream of the plasticized material (for example using a check valve).

Within the meaning of the present document, by a pressure relief may be meant relieving substantial pressures on the at least one filter device. Thus, by a pressure relief may also be meant a relief of the at least one filter device when an approximately equal pressure is exerted on the at least one filter device from both sides.

In other words, it is characteristic of the pressure relief that forces acting on the at least one filter device—preferably due to the plasticized material (above all in the flow direction of the melt stream)—can be reduced at least far enough to reduce the stresses on the at least one filter device to a sufficient extent that the at least one filter device can be changed (and preferably no damage occurs to the at least one filter device and/or the plasticizing unit when the at least one filter device is being changed).

Preferably, the at least one actuator is formed by the plasticizing screw and/or by a plunger-cylinder unit, preferably in the form of a melt accumulator.

The plunger-cylinder unit can be arranged between the at least one filter device and the plasticizing screw in terms of flow or is arranged after the at least one filter device in terms of flow.

In embodiments wherein the plasticizing screw undertakes a role as at least one actuator, a pressure relief and/or backflushing of the at least one filter device can thus be performed through an axial movement of the plasticizing screw against the flow direction of the plasticized material.

The dam element can separate the first opening and the second opening from each other in a pushed-forward position, a pulled-back position and/or every operating position lying in between.

A pushed-forward position of the dam element minus a pulled-back position of the dam element can correspond to a metering stroke of the plasticizing screw.

Preferably, the plasticizing screw has an injection plunger at the end facing the dispensing opening and/or is coupled to an injection plunger in a movement-locking manner linearly along the axis of rotation.

The injection plunger can be connected to the plasticizing screw and is formed to execute a relative movement with respect to the plasticizing screw, preferably along an axis of rotation of the plasticizing screw.

The dam element can be arranged concentrically in the injection cylinder.

The dam element can be designed as a component that is separate from the plasticizing screw, and can be connected to the plasticizing screw, for example, via a connection, preferably a screw connection. However, it is also entirely conceivable that a part of the plasticizing screw itself is formed as a dam element.

The dam element can be rotationally decoupled from the injection screw, with the result that a rotational movement of the plasticizing screw (such as occurs, for example, during the plasticizing) is not necessarily transferred to the dam element.

However, the dam element can also be connected to the plasticizing screw in a movement-locking manner (and thus also rigidly with respect to a rotational movement).

An injection plunger and/or the dam element can be formed so that it has an outer contour which corresponds to the inner contour of the injection cylinder, wherein between the injection cylinder on the one hand and the injection plunger and/or dam element on the other hand a cross section transverse to an injection direction is formed which is only interrupted by a gap between the injection plunger and/or dam element on the one hand and the injection cylinder on the other hand. This gap is preferably to be designed so small that a plasticized material cannot penetrate through the gap (apart from negligible leakage which does not affect the process or only insignificantly affects it).

Thus, in a simple manner through the use of an injection plunger and/or a dam element, the plasticizing zone can be separated from the space in front of the screw, whereby the plasticized material is necessarily channeled through the first opening and preferably a molten material line and thus has to pass through a filtration in the molten material line, for example.

The injection plunger and/or the dam element, with a circumferential surface that is the opposite of the injection cylinder, can be formed leakproof with respect to a plasticized material.

Within the meaning of the present document, leakproof is to be interpreted such that a leakproofness sufficient for the process cycle can be implemented and operational leakage (for example formed due to wear and tear, tolerances or also damage between injection cylinder and plasticizing screw, dam element or injection plunger) may still be present.

The first opening from the plasticizing zone and the second opening can be at a distance from each other which corresponds to at least an injection stroke of the plasticizing screw during an injection movement, preferably an injection stroke of the plasticizing screw plus a longitudinal dimension of the dam element along the injection movement.

The plasticizing screw can have a conveying geometry.

This conveying geometry can be formed to convey the material to be plasticized and the plasticized material in the direction of the dispensing opening with a given rotational direction and to plasticize it via a shearing and shear heat that forms.

At least one further conveying geometry can be provided between the dam element and first opening, preferably which further conveying geometry is connected to the plasticizing screw in a movement-locking manner.

Through the at least one further conveying geometry, the filtered plasticized material which enters the injection cylinder again from the molten material line is plasticized (heated) a further time by shearing and shear heat between the dam element and the dispensing opening and is thus conveyed in the space in front of the screw in the direction of the dispensing opening.

Through the provision of such a further conveying geometry in the space in front of the screw, the "first-in/first-out" principle can also furthermore be implemented, wherein the filtered plasticized material which is supplied from the molten material line to the injection cylinder in the space in front of the screw can be coordinated to the effect that the plasticized material supplied earlier is also the first to leave the injection cylinder again.

The first opening and/or the second opening can be formed by at least one recess in the injection cylinder.

The at least one recess in the injection cylinder can be formed as a longitudinal groove along the axis of rotation, which longitudinal groove preferably has a varying width along the axis of rotation.

Through a corresponding design, the feeding of the molten material line and thus of the filter device can be controlled or regulated.

Protection is also sought for the use of a plasticizing screw with a dam element for retaining the plasticized material, in conjunction with a plasticizing unit, preferably a plasticizing unit according to the invention, with an axially movable mounting of the plasticizing screw and preferably an axial drive for the plasticizing screw.

The plasticizing screw can have a conveying geometry for plasticizing and conveying a material to be plasticized, preferably a plastic.

Protection is furthermore sought for a plasticizing method, preferably with a plasticizing unit according to the invention, wherein:
- a material is plasticized with the aid of a plasticizing screw arranged so as to be rotationally and linearly movable in an injection cylinder,
- material plasticized by the plasticizing screw, preferably a plasticized plastic, is conveyed out of a plasticizing zone present between plasticizing cylinder and plasticizing screw, preferably via a first opening,
- the plasticized material conveyed out of the plasticizing zone 8 is filtered outside the injection cylinder 4 and the filtered plasticized material is returned to the injection cylinder, preferably via at least one second opening.

The plasticized material can be conveyed out of the injection cylinder into at least one molten material line and is particularly preferably filtered by at least one filter device in the at least one molten material line.

A space in front of the screw can be formed along the axis of rotation of the plasticizing screw between an end of the plasticizing screw facing the dispensing opening and the dispensing opening.

Preferably, the filtered plasticized material is pushed out of a space in front of the screw present between the plasticizing screw and a dispensing opening of the injection cylinder via the dispensing opening of the injection cylinder by a dam element coupled to the plasticizing screw in a movement-locking manner or attached to the plasticizing screw via a linear movement of the plasticizing screw.

A pressure can be exerted on the filtered plasticized material by a linear movement of the injection screw, whereby the filtered plasticized material is conveyed back into at least one molten material line arranged at the second opening, preferably whereby at least one filter device arranged in the at least one molten material line is backflushed.

Protection is furthermore sought for a control or regulating device for controlling or regulating a drive of a plasticizing screw of an embodiment according to the invention of a plasticizing unit, which control or regulating device is formed to carry out a method according to the invention.

The control or regulating device can be formed for controlling or regulating a filter device, a filter change device, a valve element, a discharge opening, a plasticizing screw. It can alternatively or additionally be provided that the control or regulating device is formed to control or regulate a drive device, a drive and/or a control or regulating element of one of the previously listed elements.

The control or regulating device is or can be connected in a signal-carrying manner to at least one sensor, wherein preferably a characteristic signal of the at least one sensor is taken into account for the control or regulation.

By a control or regulating device may be meant those components of a plasticizing unit which allow a control of actuators, drives and/or drive control systems, which in particular comprises so-called "programmable logic controllers" (PLCs). This can also include receiving sensor data and carrying out calculation processes for a control process, which can be carried out in real time depending on the control diagram.

The control or regulating unit can be realized by a central machine control system or a control or regulating unit of the molding machine or undertakes the tasks thereof.

The function of the control or regulating device can be undertaken by a control or regulating device linked directly to the molding machine and/or the plasticizing unit or a control or regulating device connected to the molding machine and/or the plasticizing unit by a data transmission connection.

The data transmission connection can preferably be formed as a remote data transmission connection. The remote data transmission connection can be realized by means of a LAN (Local Area Network), WLAN (Wireless Local Area Network), WAN (Wide Area Network) and/or different (internet) protocols.

The data transmission and relaying to the manufacturer or a maintenance service provider, as well as the processing by them, can likewise be provided.

The at least one control or regulating device can be formed to control or regulate the plasticizing screw and/or a drive of the plasticizing screw taking into account characteristic signals of at least one sensor, preferably at least one sensor in the molten material line, so that a filter device in the molten material line between the first opening and the second opening is backflushed.

This can be effected in that a filter blocking or filter coating is ascertained by a control or regulating device via the at least one sensor and the characteristic signal measured by the at least one sensor.

Such a sensor can be, for example, at least one or a combination of the following:
- a pressure sensor, which measures a pressure increase before the filter device,
- at least two pressure sensors, which measure a pressure drop in the flow direction along the filter device, in particular before and after the filter device,
- a color or optical sensor, which measures a blocking and/or coating of the filter device by detecting a visual contamination of the filter device and/or the plasticized material and/or
- a sensor of other process parameters which allow a blocking and/or coating of the filter device to be deduced.

With the aid of predefined stored or predefinable limit values and/or limit ranges, the control or regulating device can be formed to perform and/or signal a necessary filter change and/or a filter cleaning of the filter device because of the determined filter blocking or filter coating.

A corresponding filter change and/or a filter cleaning can for example be signaled, by the control or regulating device through acoustic, haptic and/or optical signals, to a user who can initiate a filter change and/or a filter cleaning. It can also be provided that, in the case of too great a filter blocking or filter coating, the control or regulating device is formed to automatically interrupt the plasticizing process, in order to carry out a filter change and/or a filter cleaning.

A signal characteristic of the determined filter blocking or the filter coating can be transmitted by the control or regulating device to a manufacturer or a maintenance service provider, who, on the basis of the transmitted signals, can provide, for example in an automated manner, maintenance personnel and/or maintenance material (such as for example filter elements for the filter device) for the filter change and/or for the filter cleaning.

When a filter change is carried out, the control or regulating device can be formed:
- to interrupt a plasticizing process,
- to carry out a pressure relief of the at least one filter device,
- to carry out a filter change, for example by controlling or regulating a filter change device, and
- to resume a plasticizing process.

When a filter cleaning is carried out, the control or regulating device can be formed:
- to interrupt a plasticizing process,
- to carry out a backflushing of the filter device, for example by controlling or regulating a plasticizing screw,
- to discharge a backflushed plasticized material from the plasticizing unit, for example by controlling or regulating a discharge opening, and
- to resume a plasticizing process.

BRIEF DESCRIPTION OF THE DRAWINGS

Further advantages and details of the invention are revealed by the figures and the associated description of the figures, in which:

FIGS. 3 and 4 show a second embodiment of a plasticizing unit according to the invention, FIGS. 9 and 10 show a seventh embodiment of a plasticizing unit according to the invention, FIGS. 11 and 12 show an eighth embodiment of a plasticizing unit according to the invention, FIGS. 13 and 14 show a ninth embodiment of a plasticizing unit according to the invention, FIG. 15 shows a tenth embodiment of a plasticizing unit according to the invention, FIGS. 16a-16c show a filter device with filter change device.

DETAILED DESCRIPTION OF THE INVENTION

Figure 1:
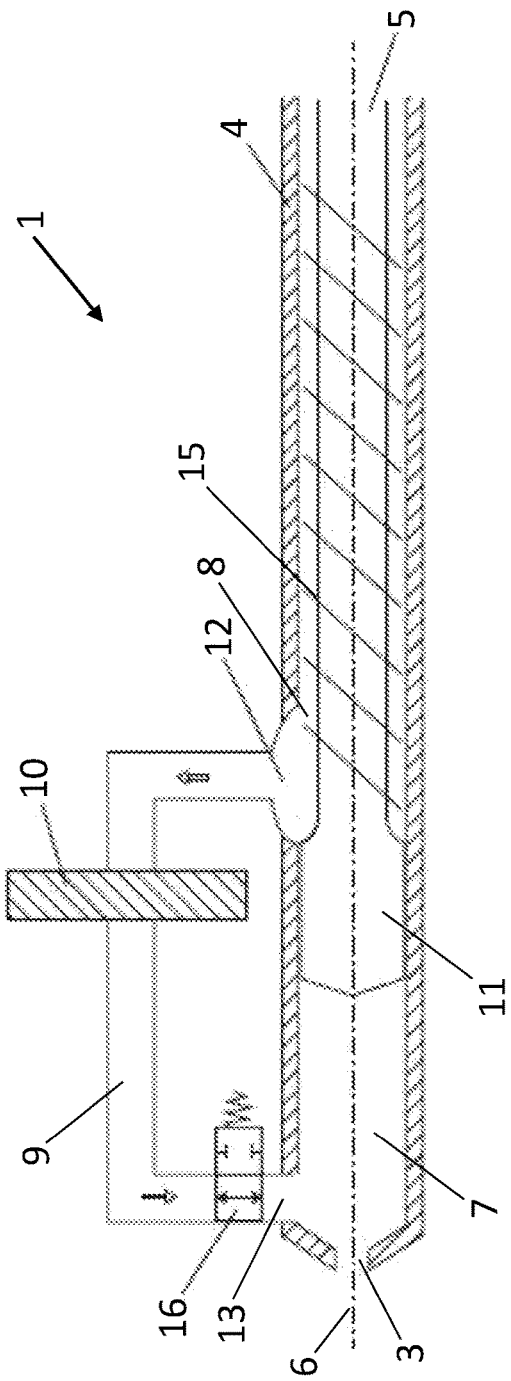
FIGS. 1 and 2 show a first embodiment of a plasticizing unit according to the invention.

FIG. 1 shows a first embodiment of a plasticizing unit 1, comprising an injection cylinder 4 and a plasticizing screw 5 arranged in the injection cylinder 4.

The plasticizing screw 5 is formed to perform, in the injection cylinder 4, a rotational movement about the axis of rotation 6 for plasticizing a material, as well as to perform a linear movement along the axis of rotation 6 for pushing out the plasticized material.

The injection cylinder 4 has a dispensing opening 3, via which dispensing opening 3 plasticized material can be pushed out of the injection cylinder and can for example be injected into a mold 24.

A space in front of the screw 7 is provided along the axis of rotation 6 of the plasticizing screw 5 between the dispensing opening 3 and the end of the plasticizing screw 5 facing the dispensing opening 3.

The plasticizing zone 8 is formed between the plasticizing screw 5 and the injection cylinder 4 in the radial direction relative to the axis of rotation 6 of the plasticizing screw 5.

A molten material line 9 is furthermore provided, which branches off from the injection cylinder 4 out of the plasticizing zone 8 via the first opening 12 of the injection cylinder 4 and opens into the injection cylinder 4 again via the second opening 13 of the injection cylinder 4 with the space in front of the screw 7.

The plasticizing screw furthermore has a dam element 11 at an end facing the dispensing opening 3, wherein in this embodiment the dam element 11 is formed in one piece with the plasticizing screw 5.

The filter device 10 for filtering a plasticized material is furthermore provided in the bypass line 9.

The molten material line 9 can be sealed off with respect to the space in front of the screw 7 by the valve element 16 which here is a check valve.

During a cycle of the plasticizing unit, a material to be plasticized is now moved from a rear area of the plasticizing screw 5 via the conveying geometry 15 of the plasticizing screw 5 in the direction of the plasticizing zone 8, wherein due to the shearing, shear heat and optionally externally introduced heat the material to be plasticized is plasticized in the plasticizing zone 8.

The material and the plasticized material are conveyed by the conveying geometry 15 of the plasticizing screw 5 in the direction of the dispensing opening 3 until the plasticized material emerges from the plasticizing zone 8 via the first opening 12 from the injection cylinder 4 and is channeled into the molten material line 9.

This emerging of the plasticized material from the plasticizing zone 8 and the injection cylinder 4 is facilitated by the dam element 11, and more particularly in this embodiment, the side of the dam element 11 facing away from the space in front of the screw 7.

The dam element 11 has an external geometry that corresponds to the internal geometry of the injection cylinder 4, with the result that between dam element 11 and injection cylinder 4 only a small gap remains, which is chosen so that it is formed leakproof with respect to a plasticized material.

This means that the gap between dam element 11 and injection cylinder 4 is formed so small that plasticized material cannot penetrate through it.

The material plasticized by the plasticizing screw 5 is thus driven through the molten material line 9 and the filter device 10 arranged therein.

The filter device 10 is formed to filter contaminants out of the plasticized material, wherein these contaminants remain in the filter device and the filtered plasticized material is channeled through the molten material line 9 via the valve element 16 and the second opening 13 of the injection cylinder 4 back into the injection cylinder 4, and more particularly in this embodiment, back into the space in front of the screw 7.

The filtered plasticized material now accumulates in the space in front of the screw 7.

As the dispensing opening 3 is closed during the plasticizing (for example via a hotrunner closure system), a melt cushion consisting of plasticized material builds up in the space in front of the screw 7, which pushes the plasticizing screw 5 away backwards, whereby the space in front of the screw 7 increases in size.

Figure 2:
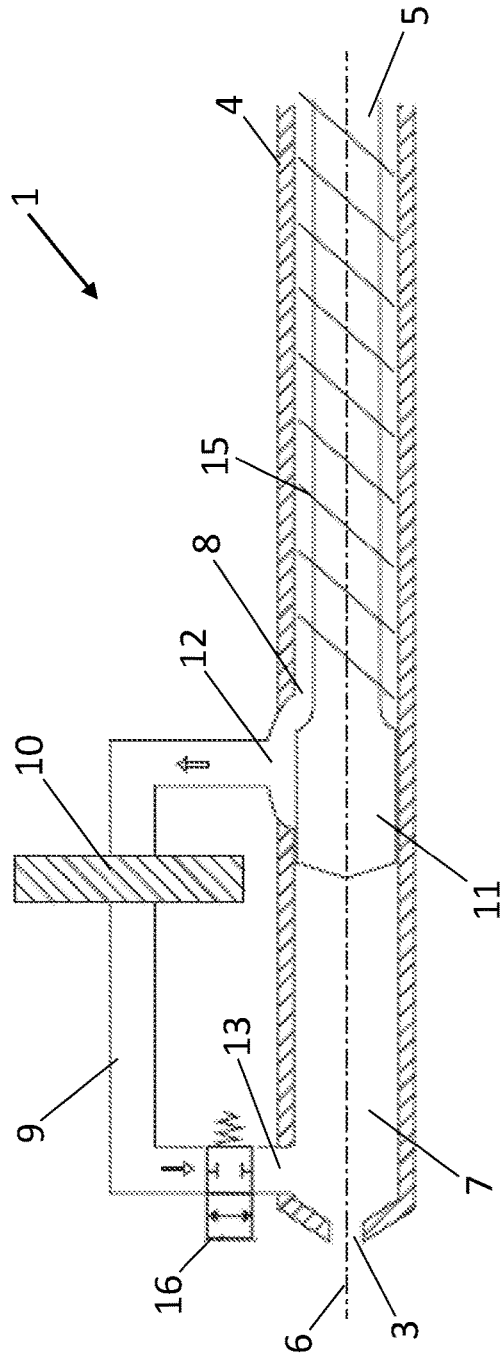

This plasticizing process (often also referred to as metering) is performed until a desired quantity of plasticized material is present in the space in front of the screw 7 (as can be seen in FIG. 2).

If this desired plasticized material for the further processing is achieved in the space in front of the screw 7, the valve element 16 is closed, the dispensing opening 3 is opened and then the dam element 11 is moved in the direction of the dispensing opening 3 via a linear movement of the plasticizing screw 5, wherein, via the dam element 11, the plasticized material is pushed out of the space in front of the screw 7 via the dispensing opening 3 and is for example supplied to a mold 24, and more particularly in this embodiment, a cavity of the mold 24.

FIGS. 3 and 4 show a further embodiment of a plasticizing unit 1, wherein the plasticizing unit is again represented during a plasticizing in FIG. 3, and FIG. 4 shows the plasticizing unit 1 just before the injection process.

In comparison with FIGS. 1 and 2, the embodiment of the plasticizing unit 1 of FIGS. 3 and 4 has a plasticizing screw 5 which is again formed in one piece with a dam element 11, but wherein between dam element 11 and dispensing opening 3 a further conveying geometry 14 is provided, which is formed by a screw extension.

After the filtration of the plasticized material by the filter device 10, the plasticized material returned to the space in front of the screw 7 via the second opening 13 can be conveyed, via this further conveying geometry 14, further in the direction of the dispensing opening 3 and heated/plasticized once again via shearing and shear heat.

A nonreturn valve 30, which serves to prevent the plasticized material from flowing back out of the space in front of the screw 7 to the further screw geometry 14 during the injection, is arranged at the end of the further conveying geometry 14 facing the dispensing opening 3.

Through the provision of the nonreturn valve 30 and the further screw geometry 14, a valve element 16 is not necessary in the embodiment of FIGS. 3 and 4.

Figure 5:
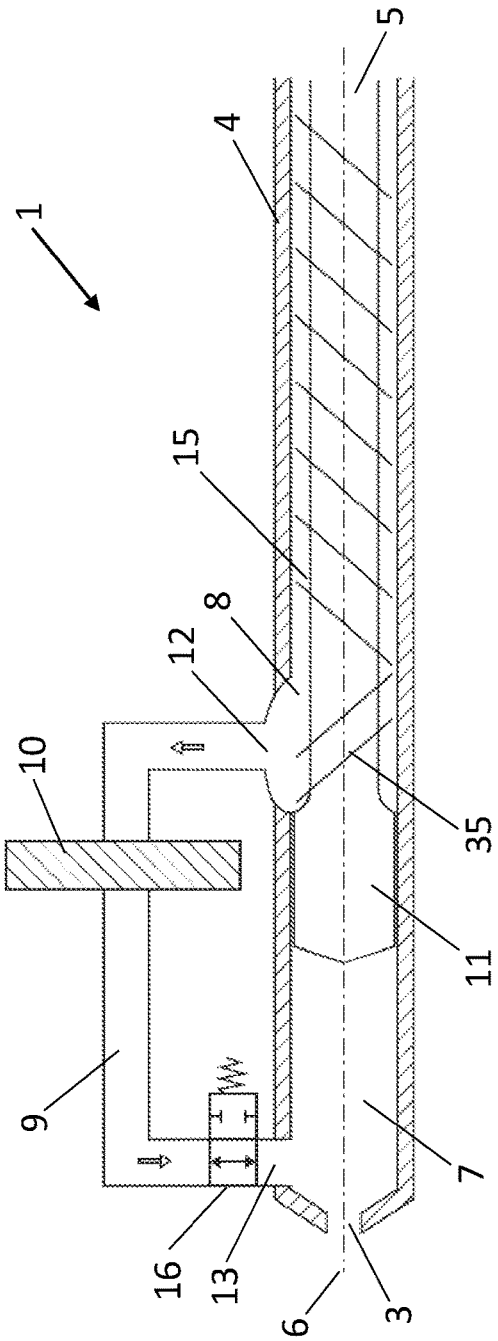
FIG. 5 shows a third embodiment of a plasticizing unit according to the invention.

It can also be provided that the plasticizing screw 5, as represented in FIGS. 4 and 5, only has a cylindrical extension instead of the further screw geometry 14, wherein a nonreturn valve 30 can be arranged at an end of the cylindrical extension facing the dispensing opening, wherein a valve element 16 can likewise be dispensed with by means of such an embodiment.

FIG. 5 shows a third embodiment of a plasticizing unit 1 which, in comparison with the embodiment of FIG. 1, has a converse conveying geometry 35 on the plasticizing screw 5.

This converse conveying geometry 35 is formed in an area between the first opening 12 and the second opening 13 of the injection cylinder 4, more precisely in an area between the first opening 13 and the dam element 11.

The converse conveying geometry 35 of the plasticizing screw 5 changes from the conveying geometry 15 of the plasticizing screw 5 into the converse conveying geometry 35.

Through the provision of the converse conveying geometry 35, the plasticized material can additionally be retained in the area of the transition from the conveying geometry 15 into the converse conveying geometry 35 and an emerging of the plasticized material from the injection cylinder 4 through the first opening 12 can be promoted.

Figure 6:
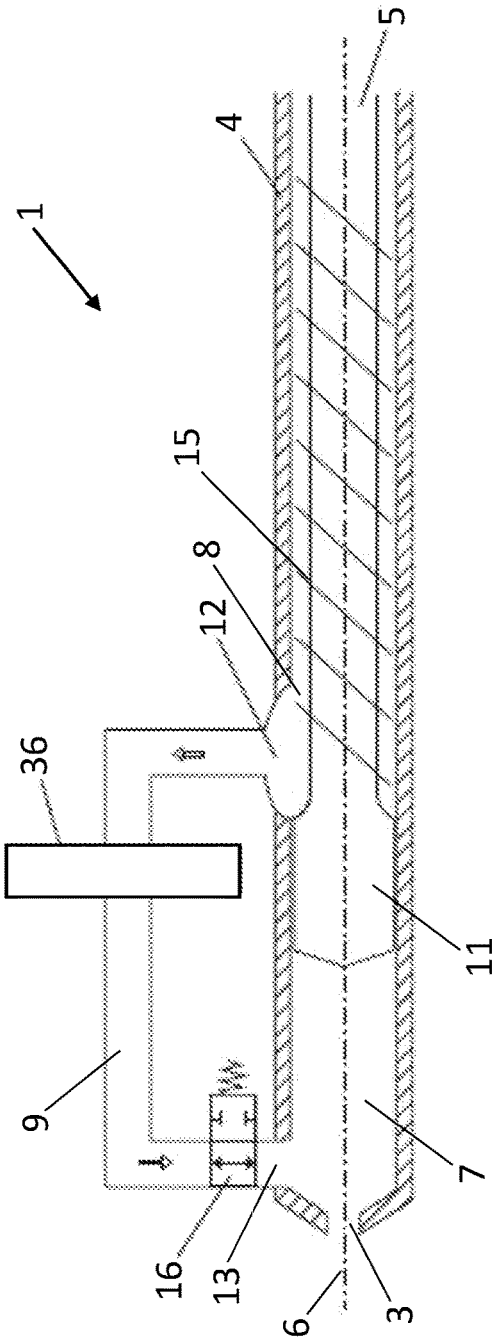
FIG. 6 shows a fourth embodiment of a plasticizing unit according to the invention.

FIG. 6 shows a fourth embodiment of a plasticizing unit 1 which, in comparison with the embodiment of FIG. 1, has a dummy 36 instead of the filter device 10.

Such a dummy 36 or also placeholder can for example be inserted into the molten material line 9 for delivery and/or transport of the plasticizing unit 1, in order to prevent damage.

When the plasticizing unit is put into operation, this dummy 36 can be removed from the molten material line 9 and replaced with a filter device 10 for the filtration of the plasticized material.

Figure 7:
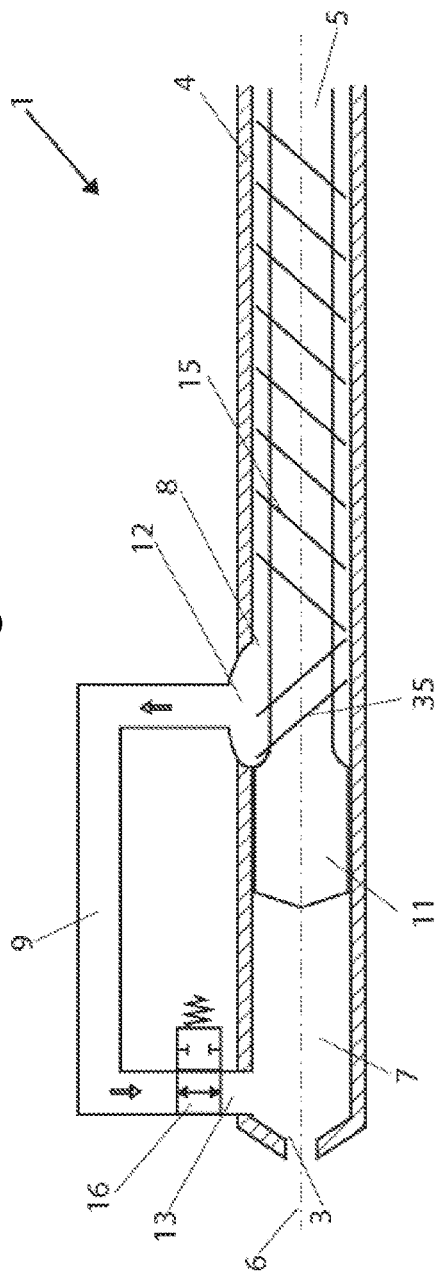
FIG. 7 shows a fifth embodiment of a plasticizing unit according to the invention.

However, it can also be provided that the dummy 36 and/or the filter device 10 are replaced with a connecting pipe or a continuous molten material line 9, wherein a clean material to be plasticized, which requires no further filtration (as can be seen in the fifth embodiment of FIG. 7), can for example be processed.

Through the provision of a connecting pipe or a continuous molten material line 9, the processing of an already clean plasticized material can thus be optimized in that, for example, an unnecessary flow obstruction, as represented by a filter device 10, can be avoided.

Figure 8:
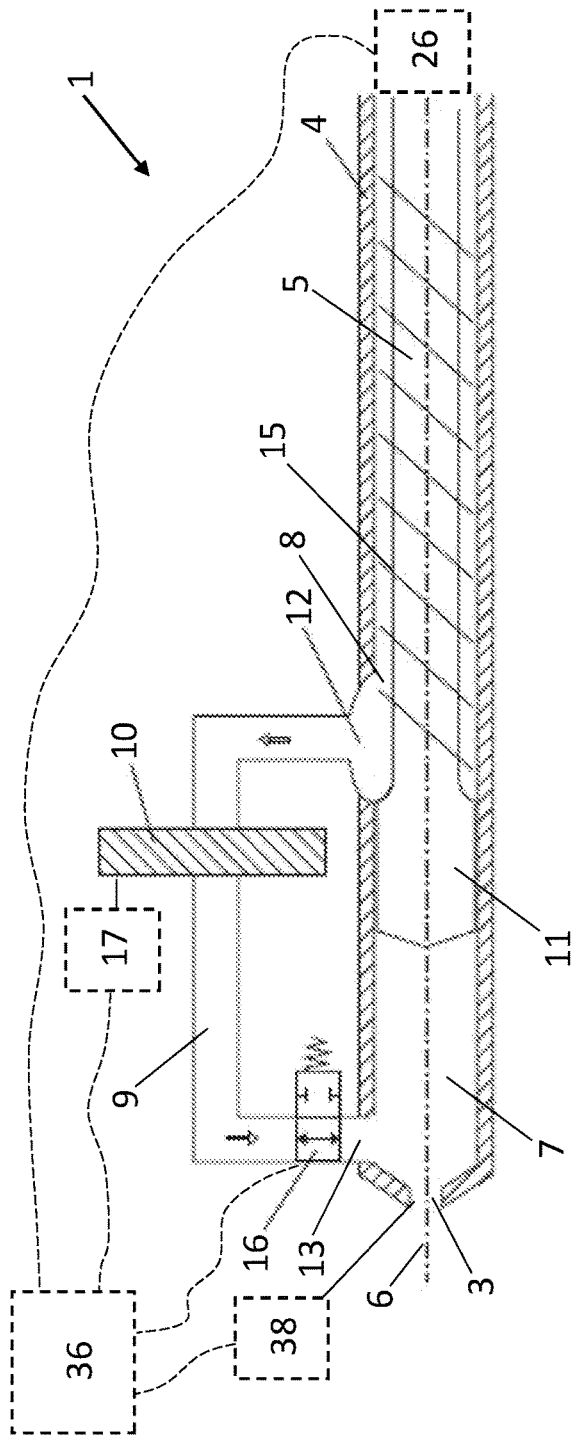
FIG. 8 shows a sixth embodiment of a plasticizing unit according to the invention.

FIG. 8 shows a sixth embodiment of a plasticizing unit 1, which has a control or regulating device 37.

This control or regulating device 37 of the plasticizing unit 1 is connected by signal-carrying connections (represented dashed here) to a drive unit 26 of the plasticizing screw 5, a filter change device 17 of the filter device 10, the valve element 16 and a shutoff nozzle 38 of the dispensing opening 3, wherein the control or regulating device 37, with the aid of the signal-carrying connections, is formed to control or regulate these elements and optionally receive characteristic signals from sensors which are arranged on these elements.

Thus, the control or regulating unit 37 can be formed, for example for the measurement of a coating or blocking of the filter device 10, to measure a pressure before and after the filter device 10 with the aid of correspondingly arranged pressure sensors and via the pressure difference between these two pressures—when the pressure difference becomes too great—to indirectly refer to the coating or blocking of the filter device 10.

When this coating or blocking of the filter device 10 reaches or exceeds a stored or predefinable limit value, the control or regulating unit 37 can be formed to carry out a filter change and/or a filter cleaning.

A filter change can be performed by the control or regulating unit 37 through a corresponding control or regulation of actuators of the plasticizing screw 5 and the filter change device 17. Reference may be made at this point to the following FIGS. 16*a* to 16*c*, wherein a filter change will be expanded on.

In the case of a filter cleaning by the control or regulating unit 37, a backflushing can for example be performed, wherein a cleaning of the filter device by backflushing the plasticized material through the filter device 10 can be performed by the control or regulating device 37 (as already described previously) through a corresponding control or regulation of the plasticizing screw 5, the valve element 16, a shutoff nozzle 38 of the dispensing opening 3 and optionally an actuator or valve element 16 of a discharge opening.

FIGS. 9 and 10 show a further embodiment of a plasticizing unit 1, wherein the plasticizing screw 5 has an injection plunger 39.

Through the provision of a plasticizing screw 5 with an injection plunger 39, the possibility can be created that a conveying geometry 15 of the plasticizing screw 5 is kept axially fixed during the entire plasticizing process, wherein, through the prevention of axial movements of the dam geometry 11, a better sealing of the dam geometry 11 with respect to the inner wall of the injection cylinder 4 as well as lower wear between dam geometry 11 and injection cylinder 4 are implemented.

During a cycle of the plasticizing unit 1, a material to be plasticized is now moved from a rear area of the plasticizing screw 5 via the conveying geometry 15 of the plasticizing screw 5 in the direction of the plasticizing zone 8, wherein due to the shearing, shear heat and optionally externally introduced heat the material to be plasticized is plasticized in the plasticizing zone 8.

The material and the plasticized material are conveyed by the conveying geometry 15 of the plasticizing screw 5 in the direction of the dispensing opening 3 until the plasticized material emerges from the plasticizing zone 8 via the first opening 12 from the injection cylinder 4 and is channeled into the molten material line 9.

This emerging of the plasticized material from the plasticizing zone 8 and the injection cylinder 4 is facilitated by the dam element 11.

The material plasticized by the plasticizing screw 5 is thus driven through the molten material line 9 and the filter device 10 arranged therein.

The filter device 10 is formed to filter contaminants out of the plasticized material. These contaminants remain in the filter device, and the filtered plasticized material is channeled through the molten material line 9 via the valve element 16 and the second opening 13 of the injection cylinder 4 back into the injection cylinder 4, in this embodiment, back into the space in front of the screw 7.

The filtered plasticized material now accumulates in the space in front of the screw 7.

As the dispensing opening 3 is closed during the plasticizing (for example via a hotrunner closure system), a melt cushion consisting of plasticized material builds up in the space in front of the screw 7, which pushes the injection plunger 39 away backwards, whereby the space in front of the screw 7 increases in size.

This plasticizing process (often also referred to as metering) is performed until a desired quantity of plasticized material is present in the space in front of the screw 7 (as can be seen in FIG. 9).

If this desired plasticized material for the further processing is achieved in the space in front of the screw 7, the valve element 16 is closed, the dispensing opening 3 is opened, and then dam element 11 is moved in the direction of the dispensing opening 3 via a linear movement of the injection plunger 39 of the plasticizing screw 5. Via the injection plunger 39, the plasticized material is pushed out of the space in front of the screw 7 through the dispensing opening 3 and is, for example, supplied to a mold 24, in this embodiment, a cavity of the mold 24 (as can be seen in FIG. 10).

The remaining features of FIGS. 9 and 10 substantially correspond to those of FIGS. 1 and 2.

FIG. 11 and FIG. 12 show an embodiment which, in comparison with the embodiment of FIG. 5 and FIG. 6, has a nonreturn valve instead of a valve element 16 formed as a 2-way valve.

FIG. 13 and FIG. 14 show an embodiment which, in comparison with the embodiment of FIG. 3 and FIG. 4, has a converse conveying geometry 35 on the plasticizing screw 5.

This converse conveying geometry 35 is formed in an area between the first opening 12 and the second opening 13 of the injection cylinder 4, more precisely in an area between the first opening 13 and the dam element 11.

The converse conveying geometry 35 of the plasticizing screw 5 changes from the conveying geometry 15 of the plasticizing screw 5 into the converse conveying geometry 35.

Through the provision of the converse conveying geometry 35, the plasticized material can additionally be retained in the area of the transition from the conveying geometry 15 into the converse conveying geometry 35 and an emerging of the plasticized material from the injection cylinder 4 through the first opening 12 can be promoted.

It can for example be provided that the first opening 12 is formed as a recess in the injection cylinder 4, which recess is formed by a longitudinal groove with a varying width along the axis of rotation 6, as can be seen in the embodiment of FIG. 15.

FIG. 15 shows a top view of an injection cylinder 4, wherein the inside of the injection cylinder 4 and thus the plasticizing screw 5 arranged in the injection cylinder 4 can be recognized through the first opening 12.

A flow direction of the plasticized material is illustrated by the arrow represented, wherein the material plasticized by the plasticizing screw 5 is conveyed in the direction of the first opening 12, before the plasticized material leaves the injection cylinder 4 via the first opening 12.

If the dam element (such as for example in the case of an embodiment of FIGS. 1-8 or 13-14), together with the plasticizing screw 5, now makes an axial movement in the injection cylinder 4, it may be the case that, in certain operating states, areas of the first opening 12 are at least partially covered (see in particular FIG. 2).

In order nevertheless to be able to implement a sufficient volume flow of plasticized material out of the injection cylinder 4, it can be provided to implement the first opening 12 with a varying width along the axis of rotation 6 of the plasticizing screw 5.

Through a corresponding design, the feeding of the molten material line 9 and thus of the filter device 10 can be controlled or regulated, depending on what proportion of the first opening 12 is cleared by the dam element 11.

Due to the varying width of the first opening 12, it can be achieved that for example a relatively large melt stream gets through the first opening 12, even if a relatively small part of the first opening 12 is cleared by the dam element.

Moreover, it can for example be achieved that the melt stream can be relatively finely regulated in the area of the maximum melt stream (if the first opening 12 is completely or almost completely cleared) in that the first opening 12 at the end that is on the left in FIG. 15 is relatively narrow.

FIGS. 16a to 16c show, purely schematically, a filter device 10 which has a filter change device 17.

This filter change device 17 has a first filter element 33 and a (further) second filter element 34, which can be alternately added to a fluid stream 31 consisting of plasticized material in order to filter the plasticized material and/or to remove contaminants from it.

Correspondingly (see FIG. 16a), first of all a first filter element 33 is located in the molten material line 9 in order to filter the fluid stream 31 of plasticized material.

If the first filter element 33 now has too great a coating (contamination), a filter change can be carried out.

For the measurement of a coating, a pressure can for example be measured before and after the filter element 33, 34 and via the pressure difference between these two pressures—when the pressure difference becomes too great—the coating of the filter element 33, 34 can be referred to indirectly.

The cyclic filter change represents an alternative solution, wherein, according to empirical values, the filter elements 33, 34 are exchanged after a certain number of plasticizing cycles have been carried out.

During a filter change (such as is represented by FIG. 16b), the fluid stream 31 of plasticized material is briefly interrupted and, via a change system 32, the first filter element 33 is taken out of the molten material line 9 and replaced with the second filter element 34.

After the change has been effected, the fluid stream 31 of plasticized material can be started again and supplied to the second filter element 34 (see FIG. 16c).

The filter element 33 can then be cleaned while the second filter element 34 is being used and exchanged again once a coating of the second filter element 34 in the fluid stream 31 of plasticized material becomes too great.

It can be provided that the molten material line 9 is formed as a hotrunner system, with the result that during the filter change the plasticized material in the molten material line 9 does not cool too much and possibly solidify.

Figure 17:
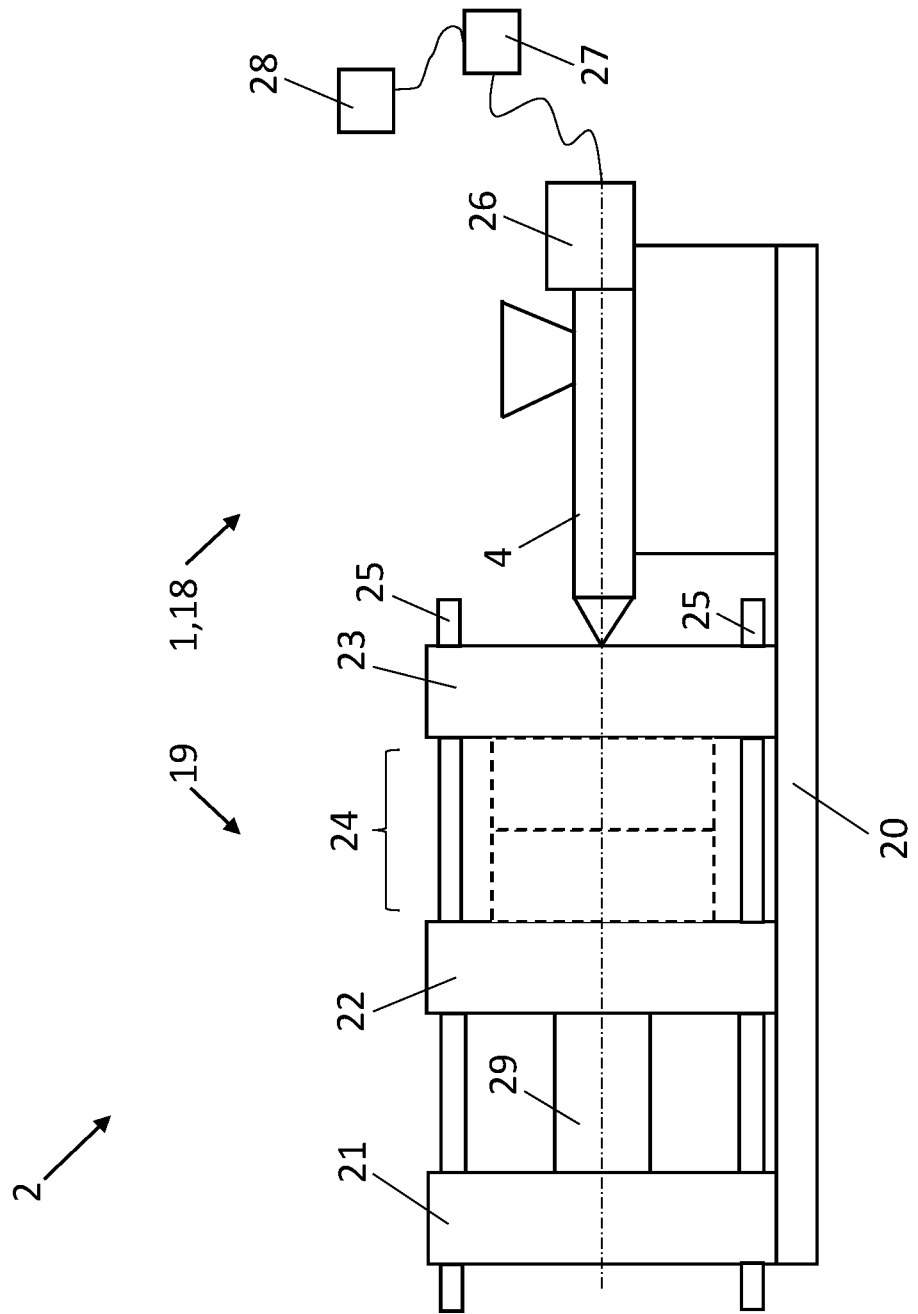
FIG. 17 shows a molding machine.

The molding machine 2 represented by way of example in FIG. 17 is an injection-molding machine and has an injection unit 18 and a clamping unit 19, which are arranged together on a machine frame 20. The machine frame 20 could alternatively also be formed multi-part.

The clamping unit 19 has a fixed platen 21, a movable platen 22 and an end plate 23.

The movable platen 22 is movable relative to the machine frame 23 via a symbolically represented knuckle joint mechanism 29.

Mold halves of a mold 24 can be clamped or fitted (represented dashed) on the fixed platen 21 and the movable platen 22.

The fixed platen 21, the movable platen 22 and the end plate 23 are mounted and guided relative to each other by the rails 25.

The mold 24 represented closed in FIG. 17 has at least one cavity. An injection channel, via which a plasticized material can be supplied to the plasticizing unit 2, leads to the cavity.

FIG. 17 shows a molding machine 2 with an injection unit 18, wherein the injection unit 18 shown in this embodiment has a plasticizing screw 5 formed as an injection screw, which is also used for plasticizing a material to be plasticized.

The injection unit 18 of this embodiment has an injection cylinder 4 and a plasticizing screw 5 arranged in the injection cylinder 4. This plasticizing screw 5 is rotatable about an axis of rotation 6 as well as movable axially along the axis of rotation 6 in the conveying direction.

These movements are driven via a schematically represented drive unit 26. This drive unit 26 preferably comprises a rotary drive for the rotational movement and a linear drive for the axial injection movement.

The plasticizing unit 1 (and thus the injection unit 18) is in signaling connection with a control or regulating unit 27. Control commands are for example output to the plasticizing unit 1 and/or the drive unit 27 by the control or regulating unit 27.

The control or regulating unit 27 can be connected to an operating unit and/or a display device 28 or can be an integral constituent of such an operating unit.

It can be provided that the control or regulating unit 27 of the molding machine 2 at least partly undertakes the function of the control or regulating device 37 of the plasticizing unit 1, is formed as the latter or alternatively even is implemented independently and/or separately from the latter.

LIST OF REFERENCE NUMBERS

1 plasticizing unit
2 molding machine
3 dispensing opening
4 injection cylinder
5 plasticizing screw
6 axis of rotation
7 space in front of the screw
8 plasticizing zone
9 molten material line
10 filter device
11 dam geometry
12 first opening of the injection cylinder
13 second opening of the injection cylinder
14 further conveying geometry
15 conveying geometry
16 valve element
17 filter change device
18 injection unit
19 clamping unit
20 machine frame 21 fixed platen
22 movable platen
23 end plate
24 mold
25 rail
26 drive unit
27 control or regulating unit
28 display device
29 knuckle joint mechanism
30 nonreturn valve
31 fluid stream
32 change system
33 first filter element
34 second filter element
35 converse conveying geometry
36 dummy
37 control or regulating device
38 shutoff nozzle
39 injection plunger

The invention claimed is:

1. A plasticizing unit for a molding machine, the plasticizing unit comprising:
    an injection cylinder having a dispensing opening to dispense a plasticized material; and
    a plasticizing screw arranged in the injection cylinder, the plasticizing screw being rotationally movable and linearly movable in the injection cylinder by a drive unit configured to linearly move the plasticizing screw over an injection stroke length during an injection movement, the plasticizing screw having an axis of rotation,
    wherein a plasticizing zone is located between the plasticizing screw and the injection cylinder in the radial direction relative to the axis of rotation of the plasticizing screw,
    wherein the plasticizing screw has a dam element, and the injection cylinder has a first opening in the area of the plasticizing zone and/or the dam element and has a second opening between the dam element and the dispensing opening, and
    wherein the first opening and the second opening are spaced apart a distance from each other, the distance corresponding to the injection stroke length.

2. The plasticizing unit according to claim 1, further comprising a molten material line fluidically connecting the first opening to the second opening.

3. The plasticizing unit according to claim 2, further comprising a filter device in the molten material line to filter the plasticized material.

4. The plasticizing unit according to claim 3, wherein the filter device has a filter change device.

5. The plasticizing unit according to claim 4, wherein the filter device is a cassette filter.

6. The plasticizing unit according to claim 2, wherein the molten material line has a valve element.

7. The plasticizing unit according to claim 6, wherein the valve element is arranged in the molten material line between the filter device and the second opening of the injection cylinder.

8. The plasticizing unit according to claim 6, wherein the valve element is a check valve.

9. The plasticizing unit according to claim 2, wherein the molten material line has a discharge opening.

10. The plasticizing unit according to claim 9, wherein the discharge opening is located between the filter device and the first opening of the injection cylinder.

11. The plasticizing unit according to claim 1, wherein the dam element is connected to an injection plunger and/or is formed as an injection plunger.

12. The plasticizing unit according to claim 1, wherein the dam element has a circumferential surface opposing an inner surface of the injection cylinder, the dam element being leakproof with respect to a plasticized material and/or having a converse conveying geometry.

13. The plasticizing unit according to claim 1, wherein a conveying geometry is arranged between the dam element and the dispensing opening.

14. The plasticizing unit according to claim 13, wherein the conveying geometry is fixed to the plasticizing screw so as to move only with the plasticizing screw.

15. The plasticizing unit according to claim 1, wherein a conveying geometry of the plasticizing screw changes into a converse conveying geometry in an area between the first opening and the second opening of the injection cylinder.

16. The plasticizing unit according to claim 1, wherein the first opening and/or the second opening is formed as a recess in the injection cylinder.

17. The plasticizing unit according to claim 16, wherein the recess is a longitudinal groove along the axis of rotation.

18. The plasticizing unit according to claim 17, wherein the longitudinal groove has a varying width along the axis of rotation.

19. A molding machine comprising the plasticizing unit according to claim 1.

20. A method of using the plasticizing unit according to claim 1, comprising using the plasticizing screw with the dam element for retaining the plasticized material, and using an axial drive for axially moving the axially movable plasticizing screw.

21. A plasticizing method using the plasticizing unit according to claim 1, comprising:
    plasticizing a material with the aid of the plasticizing screw arranged so as to be rotationally and linearly movable in the injection cylinder;
    conveying the plasticized material out of a plasticizing zone present between the injection cylinder and the plasticizing screw via the first opening, the plasticized material conveyed out of the plasticizing zone being filtered outside the injection cylinder, and
    returning the filtered plasticized material to the injection cylinder via the second opening.

22. The method according to claim 21, wherein the plasticized material is pushed out of a space in front of the plasticizing screw between the plasticizing screw and the dispensing opening of the injection cylinder and through the dispensing opening by the dam element fixed to the plasticizing screw so as to move only with the plasticizing screw or attached to the plasticizing screw via a linear movement of the plasticizing screw.

23. The method according to claim 21, further comprising exerting a pressure on the plasticized material by a linear movement of the injection screw, whereby the filtered plasticized material is conveyed back into the molten material line arranged at the second opening, and the filter device arranged in the molten material line is backflushed.

24. A control or regulating device for controlling or regulating a drive of a plasticizing screw of a plasticizing unit, the control or regulating device being configured to carry out the method according to claim 21.

* * * * *